Aug. 19, 1969     M. S. BEYER     3,462,329

PRODUCTION OF POLYETHYLENE FILM LAMINATE PACKAGES

Filed Dec. 23, 1965

MYRON S. BEYER
*INVENTOR.*

BY *Neal J. Mosely*
*his Attorney*

United States Patent Office 3,462,329
Patented Aug. 19, 1969

3,462,329
PRODUCTION OF POLYETHYLENE FILM
LAMINATE PACKAGES
Myron S. Beyer, Danville, Ill., assignor to Tee-Pak, Inc., Chicago, Ill., a corporation of Illinois
Filed Dec. 23, 1965, Ser. No. 516,027
Int. Cl. B65h 81/00; B32b 31/12, 7/14
U.S. Cl. 156—190        3 Claims

ABSTRACT OF THE DISCLOSURE

A polyethylene film laminate is prepared by feeding separate polyethylene films from storage rolls, at least one of said films being transparent so that printed matter thereon may be viewed and each of said films having one surface oxidized or irradiated to provide greater adhesion for printing inks and adhesives, bringing said films together with their untreated surfaces in contact, printing an adhesive legend on one of the oxidized or irradiated surfaces of the film plies, rolling the film plies tightly onto a storage roll to form a permanent film lamination, and separating the outermost film lamina on the roll and then unwinding the outermost lamina so that the remaining film lamina are positioned with the printing between the films.

---

Figure 1:
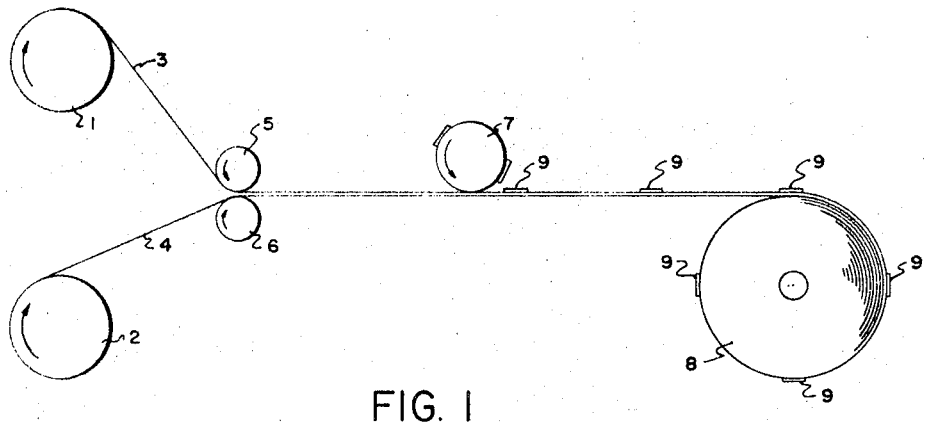

This invention relates to new and useful improvements in the production of laminated film packaging materials, packages, and methods of manufacturing the same, and more particularly to the production of polyethylene film laminates and packages thereof.

The use of various plastic film materials is well known for packaging various food products and other materials. Film laminates are frequently used, with printing or decorative material positioned between the films and the films cemented together or fused together for use in various decorative packages. In Richter U.S. Patents 2,579,968 and 2,679,969 there are described the use of a variety of film materials for making packages such as envelopes, bags, tubes, and the like, wherein such packages are formed of certain films in the form of two-ply film laminates, wherein the films adhere by inherent surface attractive forces.

The process and product of the Richter patents involves the printing of legends or decoration on the outside of a two-ply film wherein the two plies are of a film type which adhere to each other by inherent surface attractive forces. In particular, such films include Saran-Saran, Saran-pliofilm, Saran-vinyl, Saran-polystyrene, cellophane-vinyl, pliofilm-pliofilm, pliofilm-cellophane, pliofilm-vinyl, pliofilm-polystyrene, vinyl-polystyrene. In carrying out the process of Richter, one prints the desired material on the outside of one of the two plies, rolls the film onto a suitable roll, and unwinds one of the outer plies by one turn. This causes the film to be reversed so that the printing is located between the plies. In the process of Richter, it was impossible to use polyethylene films due to the fact that polyethylene is completely lacking in surface attraction which was required to effect adhesion of the films.

The use of polyethylene as a packaging film has increased considerably in recent years. However, one principal drawback to the use of polyethylene has been the difficulty of causing printing to adhere permanently to its surface, particularly where the printed film must undergo additional processing with the packaged material. It would be desirable to produce a laminated polyethylene film with printing located between the plies of film but polyethylene films do not adhere to one another and cannot be used without special treatment in the process of Richter.

It is, therefore, one object of this invention to provide a method for forming a new and improved packaging film comprising at least two plies of polyethylene, with printing positioned between the plies and protected by an overlying transparent ply of polyethylene.

Another object of this invention is to provide a new and improved process for the preparation of printed polyethylene film laminates.

A feature of this invention is the provision of an improved method for forming a film laminate product comprising an opaque polyethylene film laminated to a transparent polyethylene film with printing positioned between the plies and assisting in the adhesion of the films together.

Another feature of this invention is the provision of a new and improved process for film lamination wherein an opaque polyethylene film and a transparent polyethylene film are fed from separate supply rolls, said films having their outer surfaces oxidized or irradiated to provide a receptive surface for printing, passing the two plies together through a printing press, printing desired material in either direct form on the opaque ply or in reverse form on the transparent ply, rolling the plies onto a receiving roll under considerable pressure, and finally separating the two outermost plies and unwinding one ply only, so that the film laminate produced has the printing positioned between the plies.

Another feature of this invention is the provision of a new and improved method for forming a film laminate or a film laminate package formed of polyethylene with printing between the plies.

Other objects and features of this invention will become apparent from time to time throughout the specification and claims as hereinafter related.

This invention is based upon the discovery that polyethylene film can be laminated to itself in a printing operation to produce novel film laminates suitable for packaging purposes. The polyethylene which is used is preferably film which has been subjected during its production to a surface treatment of oxidation or irradiation on only one surface so that the film surface will be somewhat adherent to inks and adhesives, particularly polyisocyanate adhesives. In carrying out this invention it is possible to produce very novel decorative film laminates by unwinding two transparent films or a transparent film and an opaque film of polyethylene from separate supply rolls and bringing the untreated surfaces together. The two films are then passed through a printing operation wherein suitable printing is applied to one of the outer surfaces of the two plies which has been oxidized or irradiated. If the printing is done on the opaque side of the film it will be in direct form. If the printing is done on the transparent portion of the film it must be done in reverse, i.e. mirror image, form. The printed two-ply film laminate is then wound up on a suitable roll and the outer plies at the end of the roll are separated. The outermost ply is then unwound for one turn and preferably cut off so that the end of the film laminate is even. Afterward, when the two plies are unwound the films adhere to each other through the adhesive properties of the ink and the film laminate is one in which printing is located between the plies and is apparently on the surface of the opaque film with a transparent film covering it. This type of film laminate is especially useful in forming packaging tubes into which food products such as pork sausage, meat pastes, and the like, can be stuffed.

Figure 2:
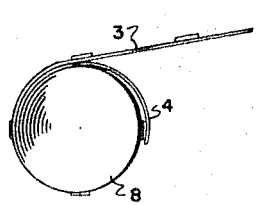
Figure 3:
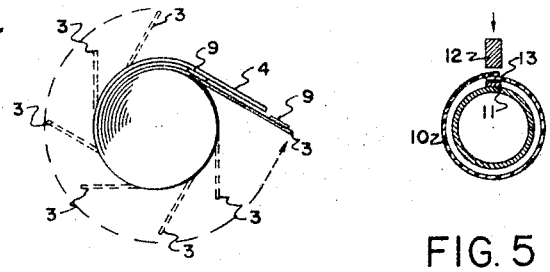
Figure 5:
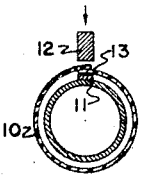
Figure 4:
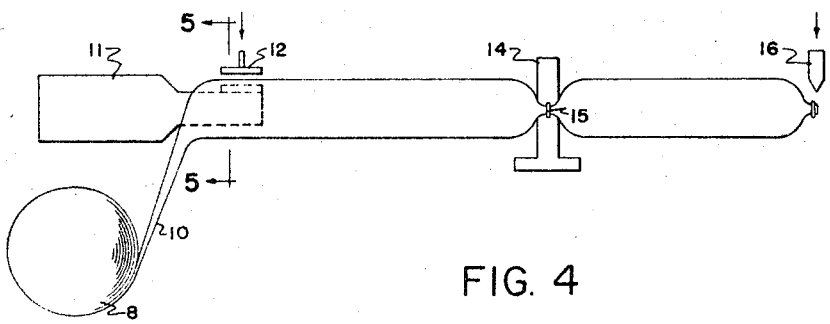

In the accompanying drawings, to be taken as a part of this specification, there are illustrated various steps in the preparation of this novel film laminate and resulting products therefrom, FIG. 1 is a schematic view showing the reeling of polyethylene films from separate supply rolls and the printing and winding of a film laminate on a product supply roll, FIGS. 2 and 3 illustrate the separation and unwinding of a single outer ply to position the printing between the film plies, FIG. 4 illustrates the use of the packaging film in a continuous stuffing operation wherein the film is formed into tubes and simultaneously stuffed and linked, and FIG. 5 illustrates schematically the sealing of the film tubes as shown in FIG. 4, and is a section taken on the line 5—5 of FIG. 4.

In FIG. 1, there are shown a pair of supply rolls 1 and 2 from which are fed separate plies of polyethylene film 3 and 4 respectively. The upper surface of film 3 is an oxidized or irradiated surface while the lower surface of film 4 is similarly treated. The oxidation or irradiation treatment of the upper and lower surfaces respectively are films 3 and 4 is effective to make those surfaces only to receptive to printing. Films 3 and 4 are passed between rolls 5 and 6 to position the films with their untreated surfaces together. The pair of films are then passed through a suitable printer 7 and the printed film laminate is wound up on product supply roll 8. The printing ink used in printer 7 impresses a suitable legend 9 on the upper surface of film ply 3. The ink which is used in printing legends 9 is preferably an adhesive type ink containing a suitable adhesive material such as a polyisocyanate for promoting maximum adhesion of the ink to the oxidized or irradiated polyethylene surface. The two plies of polyethylene with printed legends 9 thereon are wound tightly onto product storage roll 8 so that the films are pressed tightly together.

In FIG. 2 the printed film is shown wound on the product storage roll 8. The outer ply 3 is separated from ply 4 and unwound as shown in successive dotted positions in FIG. 3. When the film is unwound for one complete loop, as shown in FIG. 3, the printing 9 is positioned with the clear film overlying it to provide protection against abrasion. In carrying out this process it is preferred to use one ply of an opaque polyethylene film of a type produced by incorporation of a suitable pigment, such as, titanium dioxide, carbon black, cadmium yellow, etc., dispersed in the film. The other ply is transparent. When the printing is done on the opaque or colored film it is carried out in direct form. When the printing is done on the transparent film it is carried out in a reverse or mirror image form. In both cases, films are initially brought together with the untreated surfaces in contact and the oxidized or irradiated surfaces facing outward. By carrying out the process in this manner the printing can be done on either of the outer surfaces and the subsequent reversal of position of the films by the steps shown in FIGS. 2 and 3, is effective to bring the oxidized or irradiated surfaces with the printing on one of them into contact with each other. In this position the films are held together partially by the greater surface adhesive forces present in the face to face contact of the oxidized or irradiated surfaces, but more particularly by the adhesive effect of the printing contacting both of the surfaces. In fact, it is preferable in carrying out this process to use printing which covers substantially the entire surface of the film. If the desired legend does not cover a sufficient area then the printed area may be extended by printing a clear lacquer or adhesive as far as the added adhesive effect between the films is desired.

In carrying out this process, there are several advantages over prior art processes wherein printing and laminating are carried out separately. One principal advantage lies in the fact that the printing and laminating steps are carried out as essentially a single operation. Another advantage lies in the fact that the printing is effected on one ply while it is supported by the second ply. In prior art processes where the printing is carried out on individual plies there is much greater tendency for the film to be stretched and for there to be repeat length variations between successive printing operations which results in irregularities in the printed product which are difficult to handle. By using this process, it is possible to work with much thinner films than can be printed separately. Thus, while it is difficult to print films individually which are less than about 1 mil in thickness, it is possible to print films of the order of 50 ga. thickness using this process since the combined film thickness of the resulting laminate is about 1 mil.

In FIGS. 4 and 5 of the drawing, the application of the film for food packaging is illustrated. One of the principal applications for polyethylene film packaging is in the formation of tubes which are stuffed with food products, such as pork sausage or meat pastes, and linked to form small chubs or individual packages which are sold in the markets. The use of polyethylene for such purposes has been somewhat retarded by the fact that the handling of printed polyethylene films in food packaging apparatus tends to abrade and damage the printing on the films. Thus, it has been quite difficult to obtain printed polyethylene packages where the printing is completely resistant to handling and abrasion by machinery during the preparation of the food packages. By using the novel laminated films produced in accordance with this invention it is possible to produce novel food packages consisting of opaque polyethylene films of any suitable color with printing located on the surface of the opaque film with a clear film laminated to the opaque film protecting the printing against damage during further processing or handling.

In FIG. 4, the laminated film 10 is fed from product storage roll 8 to a food stuffing horn 11 where the film is provided with a longitudinal seam by heat sealer 12. The formation of the longitudinal seam is shown in a little more detail in FIG. 5. Heat sealer 12 is brought into contact with the lapped joint 13 of the film laminate 10 and is sealed against surface of a sealing member on stuffing horn 11. Simultaneous with the formation of the tube from the polyethylene film, the food product, such as, cheese or meat pastes, is extruded into the resulting package. It should be noted in FIG. 5 that the film laminate is sectioned for a single thickness. This is due to the fact that the film is so thin that separate plies cannot be illustrated.

The stuffed tube which leaves the stuffing horn and sealer is formed into suitable links at a linking mechanism indicated diagrammatically as 14 in FIG. 4. Linking mechanism 14 is preferably one which applies a suitable metal clip or other tie 15 to close the end of a single chub or package. After leaving the linker 14, the package is separated from succeeding packages by a suitable cutter shown diagrammatically as 16 in FIG. 4.

The printed film may also be formed into tubes or packages prior to delivery to the customer. The film may be sealed longitudinally to form continuous tubes which are marketed either on reels or cut into short lengths.

What is claimed is:

1. A method of preparing a film laminate containing a printed pattern from polyethylene which comprises feeding separate polyethylene films from storage rolls, at least one of said films being transparent so that the printed pattern may be viewed, said films having one surface oxidized or irradiated to provide greater adhesion for printing inks and adhesives, bringing said films together with their untreated surfaces in contact, printing an adhesive legend on one of the oxidized or irradiated surfaces of the film plies, rolling the printed film plies tightly onto a product storage roll to form a permanent film lamination, separating the outermost film lamina so that the remaining film lamina are positioned with the printing between the films.

2. A method as defined in claim 1 wherein one of said films is transparent and the other film is opaque.

3. A method as defined in claim 1 wherein said adhesive printing is applied over substantially the entire surface of one of said films, so that on subsequent processing the films are tightly laminated by the adhesive effect of the printing on the oxidized or irradiated surfaces which are brought into contact.

References Cited

UNITED STATES PATENTS

| | | | |
|---|---|---|---|
| 2,679,968 | 6/1954 | Richter | 156—277 XR |
| 2,679,969 | 6/1954 | Richter | 161—251 XR |
| 2,919,059 | 12/1959 | Sporka | 229—3.5 |
| 2,968,576 | 1/1961 | Keller et al. | 117—47 |

ROBERT F. BURNETT, Primary Examiner

W. A. POWELL, Assistant Examiner

U.S. Cl. X.R.

99—174, 178; 156—277, 291, 306; 161—5, 6, 412, 413; 206—46

UNITED STATES PATENT OFFICE
CERTIFICATE OF CORRECTION

Patent No. 3,462,329            Dated August 19, 1969

Inventor(s) Myron S. Beyer

It is certified that error appears in the above-identified patent and that said Letters Patent are hereby corrected as shown below:

Column 1, line 39, "2,579,968" should read -- 2,679,968 --. Column 3, line 20, cancel "to", first occurrence.

Signed and sealed this 27th day of June 1972.

(SEAL)
Attest:

EDWARD M. FLETCHER, JR.            ROBERT GOTTSCHALK
Attesting Officer                   Commissioner of Patents